(12) United States Patent
Ferguson

(10) Patent No.: US 11,292,701 B2
(45) Date of Patent: Apr. 5, 2022

(54) VEHICLE MOUNTED HOIST

(71) Applicant: Greg Ferguson, Phoenix, AZ (US)

(72) Inventor: Greg Ferguson, Phoenix, AZ (US)

(*) Notice: Subject to any disclaimer, the term of this patent is extended or adjusted under 35 U.S.C. 154(b) by 0 days.

(21) Appl. No.: 17/109,240

(22) Filed: Dec. 2, 2020

(65) Prior Publication Data
US 2021/0078839 A1 Mar. 18, 2021

Related U.S. Application Data

(63) Continuation-in-part of application No. 15/934,970, filed on Mar. 24, 2018, now abandoned.

(51) Int. Cl.
| | | |
|---|---|---|
| *B66C 23/44* | (2006.01) | |
| *B60P 1/28* | (2006.01) | |
| *B60P 1/16* | (2006.01) | |
| *B60P 1/34* | (2006.01) | |

(52) U.S. Cl.
CPC ............... *B66C 23/44* (2013.01); *B60P 1/16* (2013.01); *B60P 1/28* (2013.01); *B60P 1/34* (2013.01)

(58) Field of Classification Search
CPC ...... B60P 1/16; B60P 1/28; B60P 1/34; B60P 1/5428; B60P 1/483; B60P 1/6463; B60P 1/48; B66C 23/44
See application file for complete search history.

(56) References Cited

U.S. PATENT DOCUMENTS

| | | | | |
|---|---|---|---|---|
| 6,152,674 | A * | 11/2000 | Ogrodnick | B60P 1/6463 414/491 |
| 6,550,704 | B2 * | 4/2003 | Johnson | B02C 18/067 241/101.2 |
| 7,300,239 | B2 * | 11/2007 | Benedikt | B60P 1/6463 414/477 |
| 8,021,096 | B2 * | 9/2011 | Railsback | B60P 1/6463 414/478 |
| 8,465,246 | B2 * | 6/2013 | Duell | B60P 1/6463 414/494 |
| 8,591,164 | B2 * | 11/2013 | Prosser | B60P 1/5476 414/541 |
| 8,839,968 | B2 * | 9/2014 | Seales | B60P 1/483 212/294 |
| 9,789,802 | B2 * | 10/2017 | Bartelt | B60P 1/6463 |
| 9,821,699 | B2 * | 11/2017 | Clark | B60P 1/4492 |
| 2006/0045692 | A1 * | 3/2006 | Mills | B60P 1/6463 414/477 |
| 2006/0182573 | A1 * | 8/2006 | Taylor | B60P 1/64 414/477 |
| 2009/0115238 | A1 * | 5/2009 | Lane | B60P 1/5428 298/22 C |
| 2013/0149086 | A1 * | 6/2013 | Railsback | B60P 1/6463 414/478 |
| 2013/0230374 | A1 * | 9/2013 | Kerkvliet | B60P 1/6463 414/477 |
| 2018/0009359 | A1 * | 1/2018 | Garneau | B60P 1/48 |

* cited by examiner

*Primary Examiner* — Mark C Hageman
(74) *Attorney, Agent, or Firm* — Steven R. Fairchild; Guy Letourneua

(57) ABSTRACT

The invention is an apparatus and method for lifting objects onto the bed of a pickup truck. The device includes a rack assembly, a swing arm assembly, and at least one hydraulic arm. The invention can be optimized and adapted to fit on a standard pickup truck or a flatbed truck.

20 Claims, 22 Drawing Sheets

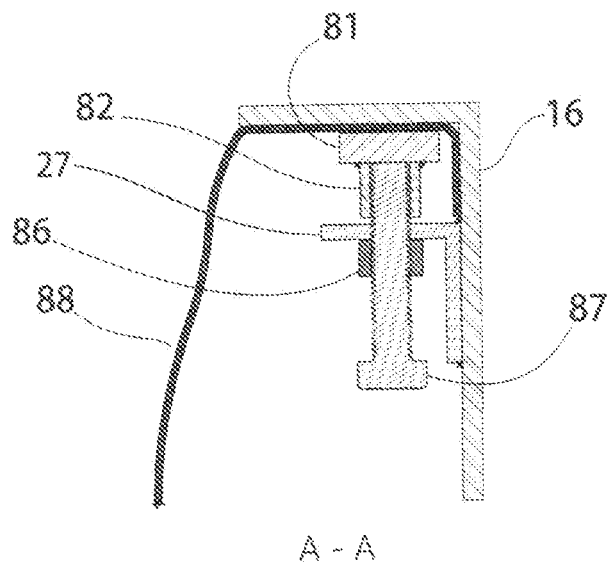
FIG. 19B
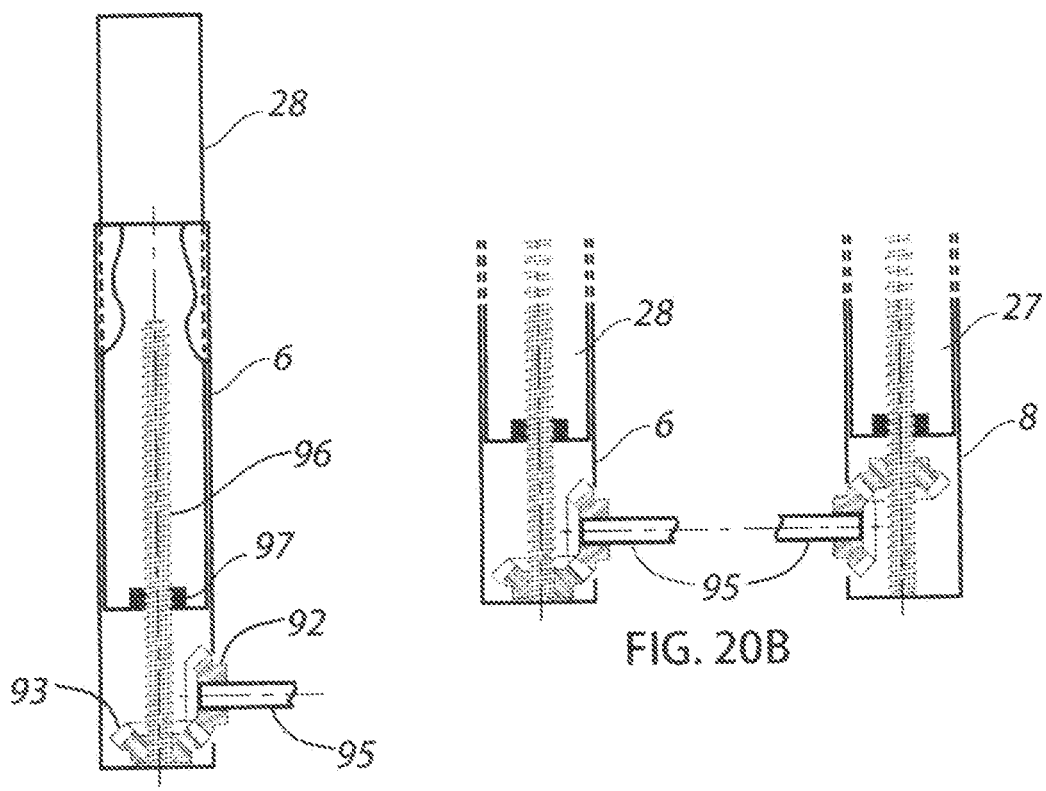
FIG. 20A
FIG. 20B

VEHICLE MOUNTED HOIST

CROSS REFERENCE TO RELATED APPLICATION

This non-provisional utility patent application is a continuation in part of non-provisional utility patent application Ser. No. 15/914,970 "Hydraulic Truck Bed Lifting Apparatus and Method" filed 24-Mar-2018. The entire contents of non-provisional utility patent application Ser. No. 15/914,970 "Hydraulic Truck Bed Lifting Apparatus and Method" filed 24-Mar.-2018 are hereby incorporated into this document by reference.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The invention relates to apparatus and method for modifying a pickup truck or a flatbed truck to include a lifting apparatus capable of moving one or more heavy work pieces into and out of the bed of the truck.

BACKGROUND

Users of pickup trucks and flatbed trucks may wish to load large, heavy, or unwieldy objects as cargo. There has long been a demand for after-market hoists for these sorts of vehicles and loading tasks, within which preferences exist for lifting capacity, operational safety, and modest cost.

BRIEF DESCRIPTION

A primary objective of the invention is to provide a hoisting device which among various embodiments may be installed onto a variety of makes and models of pickup trucks ant flatbed trucks.

Another objective of the invention is to afford safety and reliability during hoisting and positioning of objects, including excess margins of material robustness so that the hoist performs safely and without failures and without excess material deflections when handling reasonable loads.

Yet another objective of the invention is that the invention provides compactness when not in use, and is able to operate without taking up excessive space, so that the path for a load moving into or out of the truck may be as direct as possible.

BRIEF DESCRIPTION OF THE DRAWINGS

A further understanding of the nature and advantages of particular embodiments may be realized by reference to the remaining portions of the specification and the drawings, in which like reference numerals are used to refer to similar components. When reference is made to a reference numeral without specification to an existing sub-label, it is intended to refer to all such multiple similar components.

FIG. 19B shows a cross section view of bed clamp bracket components taken at section line A-A in FIG. 19A.

FIG. 20A shows an extendible beam with a cutaway of a fixed tube revealing an extendable portion linearly driven by threaded hardware powered by bevel gears.

FIG. 20B shows two extendible beams of a second pivotable frame, wherein a single drive shaft powers meshed bevel gears in each extendable beam so that their extendable portions move in tandem.

DETAILED DESCRIPTION of CERTAIN EMBODIMENTS

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this application the use of the singular includes the plural unless specifically stated otherwise, and use of the terms "and" and "or" is equivalent to "and/or," also referred to as "non-exclusive or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The invention relates to an apparatus and method for lifting objects onto the bed of a pickup truck. The device includes a rack assembly, a swing arm assembly, and at least one hydraulic arm. The invention can be optimized and adapted to fit on a standard pickup truck or a flatbed truck.

Figure 1A:
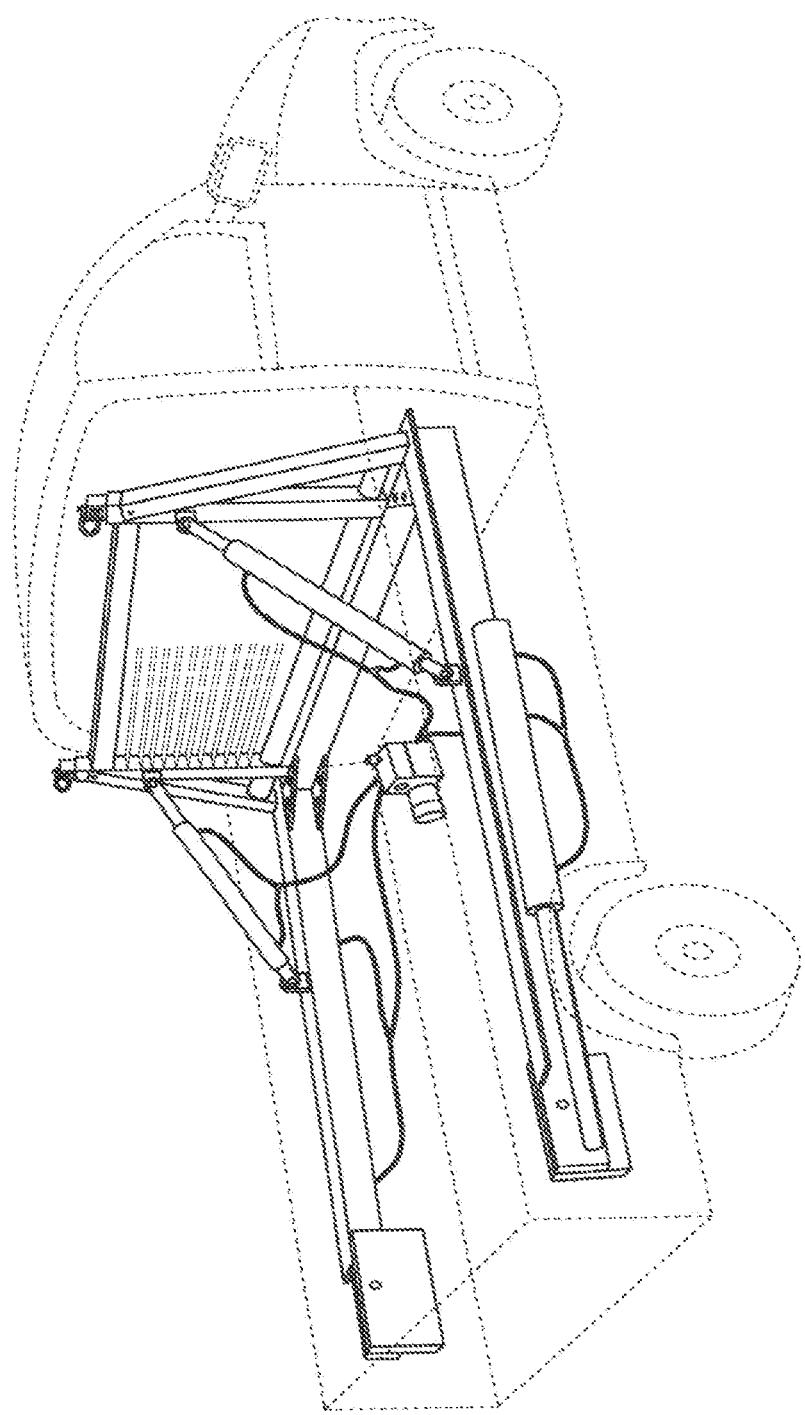
FIG. 1A shows a perspective view of an embodiment of a lifting device in accordance with the invention, mounted in the bed of a pickup truck with side rails.

FIG. 1A shows a perspective view of an embodiment of a lifting device in accordance with the invention, mounted in the bed of a pickup truck with side rails. The hoist comprises two pivotable pi-shaped frames. The terms "Pi-shaped" and "pi frame" in this specification refer to frames comprising two substantially parallel, spaced apart load bearing members and a third member substantially perpendicular to these, spanning between them similar to a lintel. The word "pi" in this usage refers to the upper case Greek letter "Π." When not in use, the first frame, which is pivotable about the ends of its legs, reposes along or atop the rear side panels of a pickup truck as seen in the figure, or in a similar orientation of repose when configured and installed on a flatbed truck.

The second frame is pivotably mounted to the transverse third member of the first frame, and when not in use it may be positioned substantially upright and behind the cab of the truck, where the structural members of the second frame may now advantageously serve as a rollover bar comprised within this second pivotable frame. If the vehicle were to overturn in an accident, the rigid members of the second frame resist compression or buckling and may protect the vehicle cab and its occupants from being crushed. An optional variant in accordance with the invention includes a plurality of slats spanning between the legs of the second pivotable frame or second pi frame, which act as a protective grille during a collision. Besides providing ornamentation, such a grille positioned behind a vehicle cab may prevent cargo in the bed from crashing into the cab in the event of abrupt deceleration.

Figure 1B:
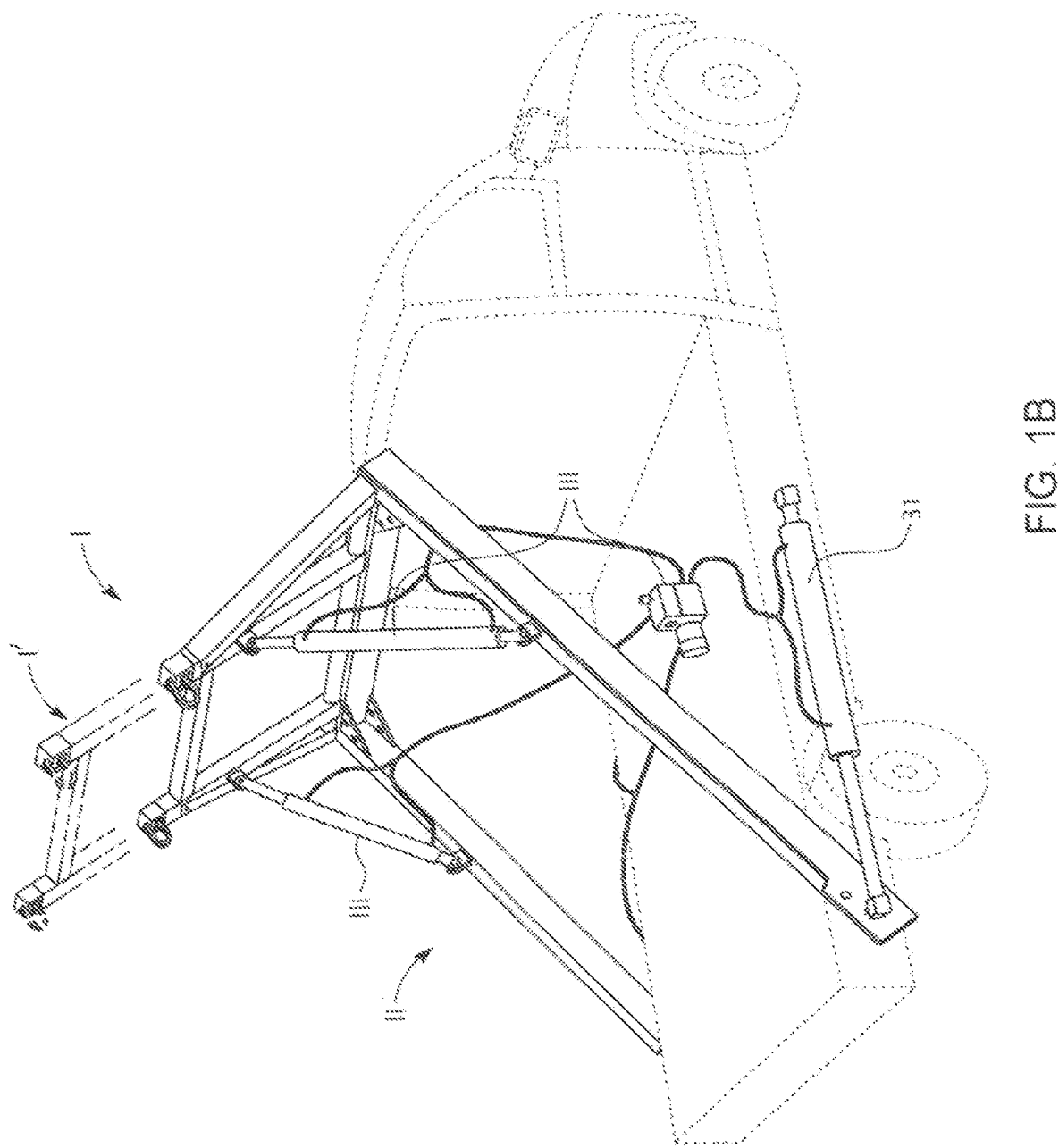
FIG. 1B shows a perspective view representative of an embodiment of a lifting device in accordance with the invention, mounted in the bed of a flatbed pickup truck, and in an inclined position.

FIG. 1B shows a perspective view representative of an embodiment of a lifting device in accordance with the invention, mounted in the bed of a flatbed pickup truck, and in an inclined position. The major components of the invention include a first, pi-shaped pivotable frame [II] and a second pi-shaped pivotable frame [I] coupled to the first pivotable frame. The second pivotable frame also has extendable beams and a tie bar spanning between the distal ends of these beams. The extendable beams are also shown in an extended position as [I'.] The second pivotable frame pivots with respect to the first frame by means of least a first force-generating extendable member [31] with its first end coupled to the first frame beam. In this illustration the force generating extendable member is a hydraulic cylinder, however, jack screws or pneumatic cylinders may also be used as embodiments within the scope of the invention. A second extendable member may be coupled similarly to opposite side of the first pivotable frame to provide additional and symmetrical hoisting and transporting forces for onboarding of offloading cargos. The second pivotable frame may be forcibly pivoted with respect to the first pivotable frame by means of at least a third and preferably third and fourth extendable members [III] coupled between the first pivotable frame the second pivotable frame.

Figure 1C:
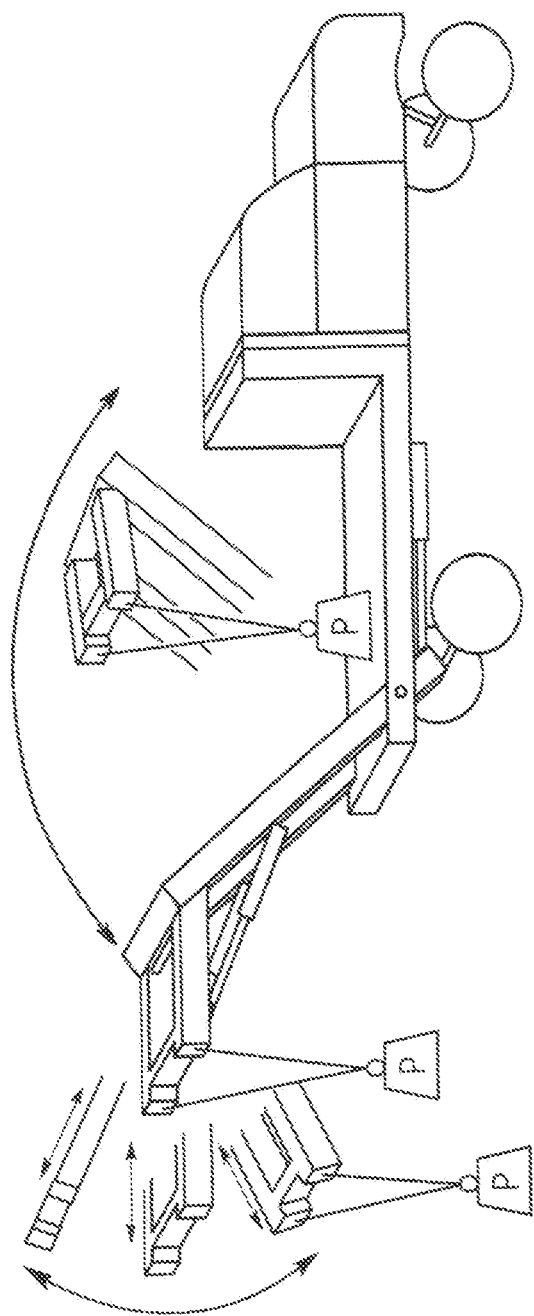
FIG. 1C shows a perspective view of a hoist assembly in accordance with the invention mounted in a truck and shown in an extended position, and also illustrating an arc of movement of the first pivotable frame relative to the bed of the truck, for discharging or lifting a cargo aboard.

FIG. 1C shows a perspective view of a hoist assembly in accordance with the invention mounted in a truck and shown in an extended position, and also illustrating an arc of movement of the first pivotable frame relative to the bed of the truck, for discharging or lifting a cargo [P] aboard. The extendable beams of the second pivotable frame increase the reach and range for acquiring and depositing cargos in the vicinity of the truck. When fully extended, the vertical lifting range of the hoist assembly is maximized. According to a preferred embodiment the first pivotable frame may pivot as much as 130° about its pivot axis, and the invention may extend about 4 feet beyond a truck tailgate with the extendable portion of the second pivotable frame in a retracted position, and may extend to about 6½ feet with the second pivotable frame in a fully extended position.

Figure 1D:
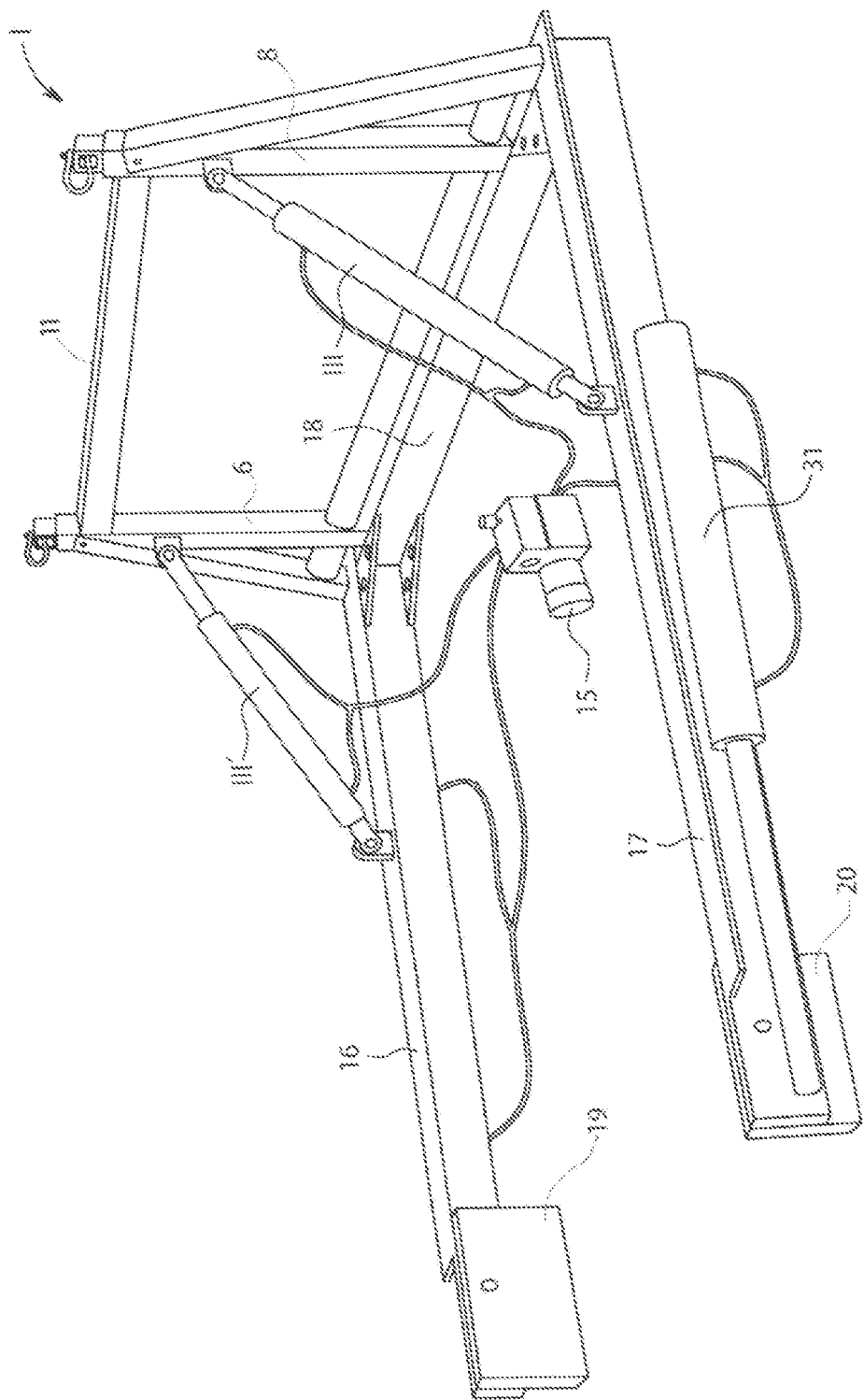
FIG. 1D shows a perspective view of an embodiment of a lifting device but without the pickup truck, outlining the main sections of the invention.

FIG. 1D shows a perspective view of an embodiment of a lifting device but without the pickup truck, outlining the main sections of the invention. The hoist assembly comprises first and second fixed rails of which reinforcing plate [19] is a component of the first fixed rail and reinforcing plate [20] is a component of the second fixed rail. A first pi frame comprises a first lintel [18] spanning between a first leg [17] and a second leg [16,] with the first leg attached to the lintel at its proximal end and rotatably coupled to the first fixed rail at its distal end, and the second leg attached to the lintel at its proximal end and rotatably coupled to the second fixed rail at its distal end. A second pi frame [I] comprises a second lintel [11] spanning between a first extendable beam [6] and a second extendable beam [8,] with the extendable beams each being rotatably coupled to the first lintel. The hoist is raised and lowered by forces generated in at least a first extendable member [31] with its first end coupled to the first leg. Preferably a second force generating extendable member is coupled between the second fixed rail and the second leg to provide symmetrical loading during the use of the hoist, which may also be described as a second extendable member coupled between the second support rail and the second frame beam. The second pi frame is pivotable with respect to the first by means of at least a third force generating extendable member [III] coupled between the first leg and the second pi frame, and preferably a fourth force generating extendable member [III'] is included, coupled between the second leg and the second pi frame for symmetrical loading. The force generating extendable members are preferably hydraulic cylinders powered by a hydraulic pump [15,] but according to other embodiments within the scope of the invention, pneumatic pistons or jack screws may also be used as force generating extendable members.

Figure 1E:
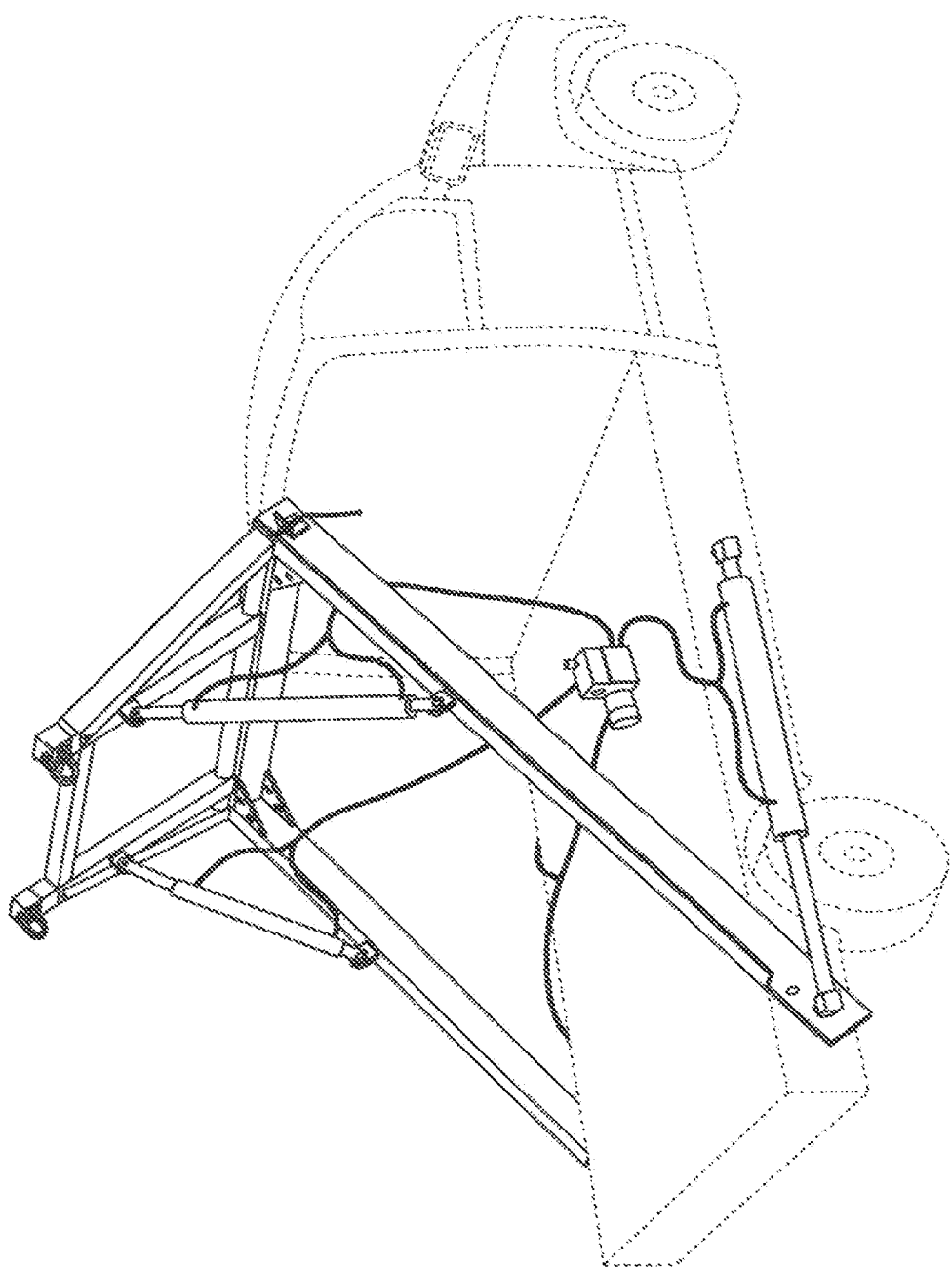
FIG. 1E shows an optional embodiment of the invention whereby the invention is secured directly to a flat truck bed.

FIG. 1E shows an optional embodiment of the invention whereby the invention is secured directly to a flatbed portion of a truck. The hoist assembly comprises first and second support rails, which may be after-market support channels installed on the truck. Alternatively, parts of the existing truck frame or other aftermarket reinforcements may be used as the support rails for the hoist. A first pivotable frame comprises a first frame beam with its proximal end rotationally coupled to the first support rail about a first axis of rotation, and a second frame beam with its proximal end is rotationally coupled to the second support rail about the same first axis of rotation. A third frame beam spans between the distal end of the first beam and the distal end of the second beam, so that during hoisting these first three beams pivot as a unit. A second pivotable frame is coupled to the first pivotable frame, and it comprises first and second extendable beams each with their proximal ends coupled to the third beam of the first pivotable frame. The second pivotable frame is rotatably coupled to the first pivotable frame about an axis parallel to the third frame beam.

A tie bar spans between distal ends of the first and second extendable beams of this second pivotable frame, and lifting force is generated by at least a first extendable member with its first end coupled to the first frame beam. Preferably a second extendable member is installed opposite the first and coupled to the second frame beam. The hoist assembly includes at least a third extendable member coupled between the first beam and the first extendable beam, but preferably also includes that third extendable member and also at least a fourth extendable member coupled between the second beam and the second extendable beam.

Figure 2A:
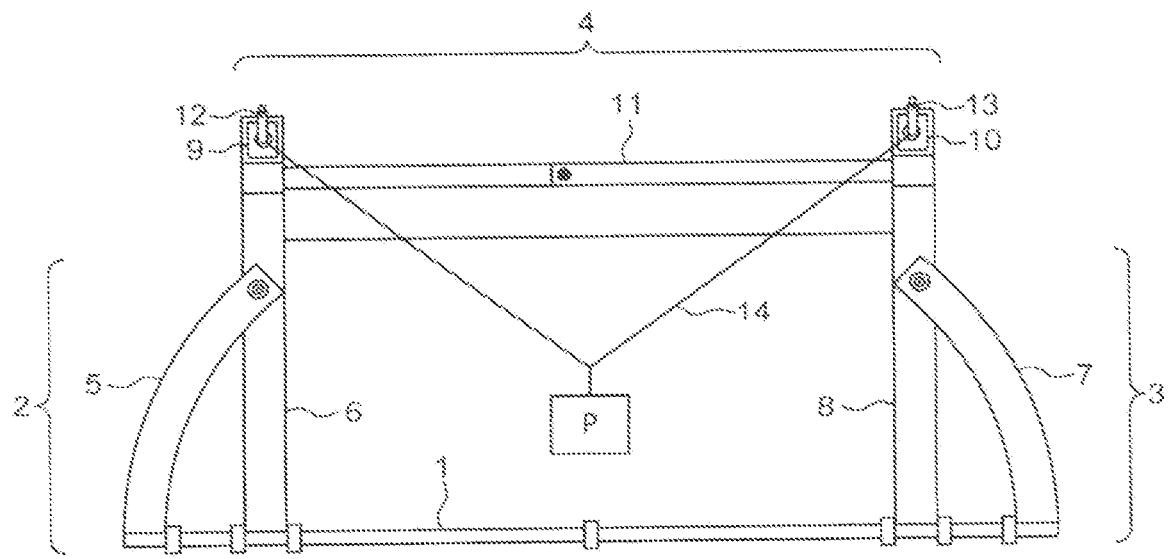
FIG. 2A shows a component view of a rack assembly in accordance with the invention.

FIG. 2A shows a component view of a rack assembly in accordance with the invention, as viewed from the rear of a truck looking forward. The rack assembly is referred to elsewhere in this specification as the second pivotable frame or the second pi frame. The rack assembly contains a support base [1] which may be separate from and parallel to the lintel of the first pi frame, or it may utilize that lintel as its support structure. The pivotable rack includes a left support structure [2,] a right support structure [3] and an extendable hoist frame [4.] In a preferred embodiment the support base is a ⅝" hardened steel shaft that employs a ⅝" pillow block for pivoting the rack assembly forward during retraction of the lifting device or backward during deployment of the lifting device. A pillow block design is preferred over the use of hinges or hinge pins because the latter are structurally weaker and have shorter wear life in heavy duty service. In a preferred embodiment both the left and the right support structures include triangular frame elements for strength and rigidity. In this preferred embodiment, the left support structure includes a left diagonal support structure [5] and a left vertical support structure [6.] Likewise, the right support structure includes a right diagonal support structure [7] and a right vertical support structure [8.] The left and right vertical support structures are both hollow at their vertical portions to allow for the insertion and extensible and retractable travel of the extendable hoist frame.

The extendable hoist bar is composed of a left vertical portion [9,] a right vertical portion [10,] a crossbeam or tie bar [11,] a left shackle [12,] a right shackle [13,] and load strap [14] which may be connected to the shackles when passed through a lifting eye of a load or cargo [15.] Nylon belt may be used as a load strap. A left extendable bar [9] inserts into the left vertical support structure while a right extendable bar inserts into the right vertical support structure. In a preferred embodiment and while retracted, the left vertical portion of the extendable bar inserts into the left vertical support structure to about 18 inches, while the right vertical portion of the extendable bar also inserts into the right vertical support structure to about 18 inches. The extendable components of the second pivotable frame are shown retracted in this view. It is seen in this view and appreciated within the practice of the invention that the rack assembly, also called a second pivotable frame or a second pi frame, is eminently suited to also serve as a rollover bar when positioned directly behind a truck cab.

Figure 2B:
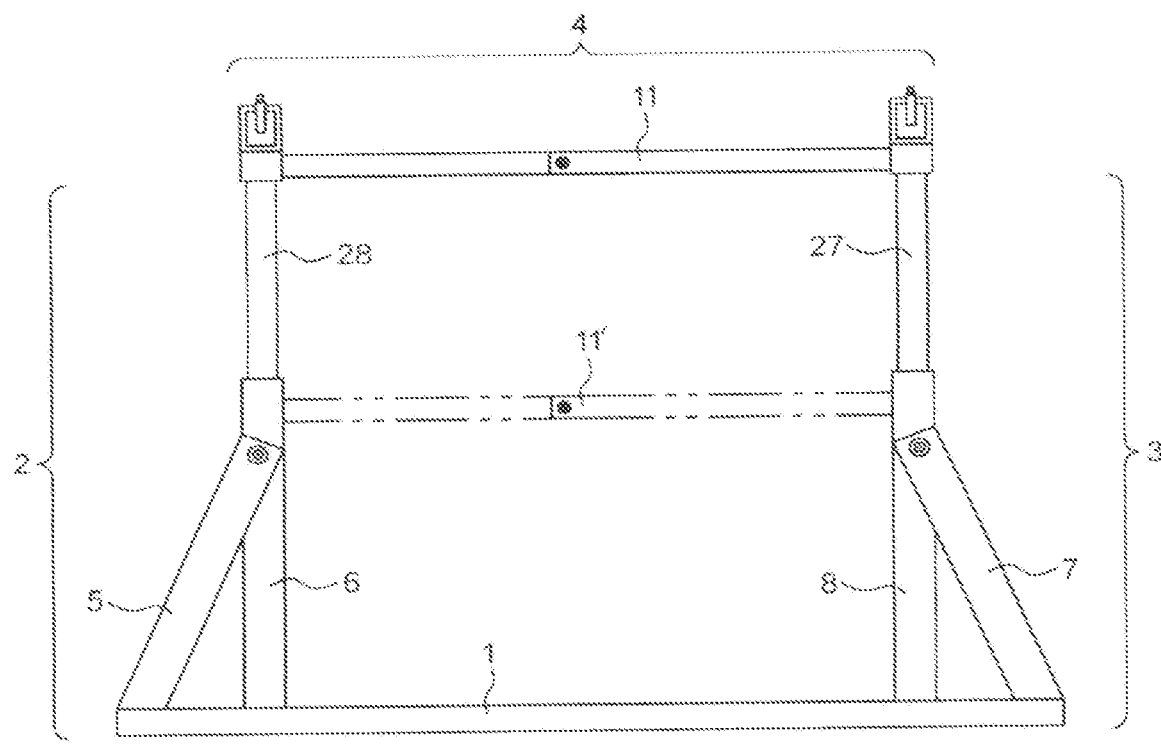
FIG. 2B shows the rack assembly of FIG. 2A, with extendable beams shown in an extended position.

FIG. 2B shows the rack assembly of FIG. 2A, with extendable beams shown in an extended position. A left extensor column [28] translates linearly within left vertical support structure [6,] and a right extensor column [27] translates linearly within right vertical support structure [8.] According to another variant embodiment within the scope of the invention and shown here with phantom lines, a tie bar [11'] may span between the fixed vertical supports so that the extendable beams may be extended and retracted independently. For other components shown in this figure, the numbering shown here is the same as in FIG. 2A.

Figure 3:
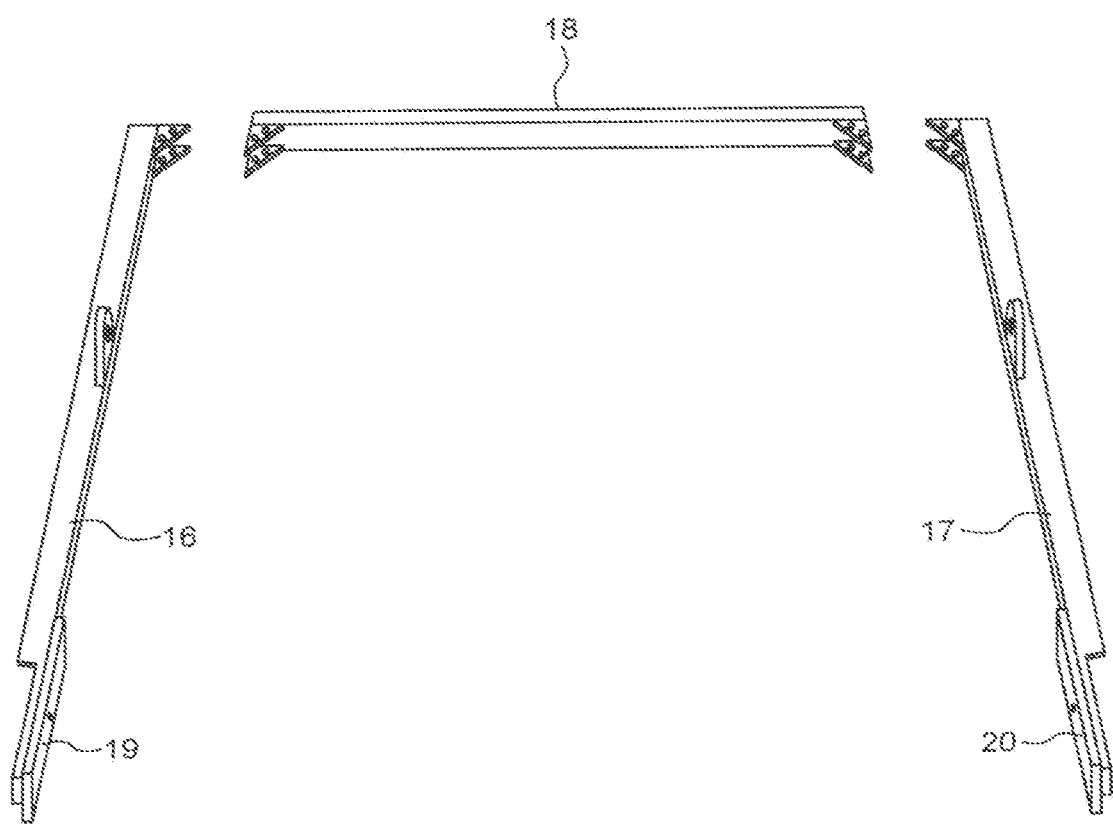
FIG. 3 shows a component view of a first pivotable frame assembly in accordance with the invention.

FIG. 3 shows a component view of a first pivotable frame assembly in accordance with the invention, which is also referred to as a first pi frame given its resemblance to upper case Greek letter Π. The pi frame comprises a lintel beam [18] spanning between first and second legs, with the first leg [17] attached to one end of the lintel at its proximal end, and the second leg [16] attached to the other end of the lintel at its proximal end. Unlike in FIG. 1D, in this embodiment shown, reinforcer plates [19] and [20] are attached to this first pivotable frame. In any case, additional reinforcer plates (not shown) may be added to the stationary structural components of the invention. The legs are reinforced at their attachments to the lintel by interleaved gussets.

In a preferred embodiment, both the first and second legs are made from 5"×3½" angle iron with ¼" thick webs and each about 73" long, and the legs are affixed at 90° angles to the lintel. The assembly shown in this figure may also be referred to as a first pivotable frame comprising a first frame beam [17,] a second frame beam [18,] and a third frame beam [18] spanning between the distal ends of the first and second beams. The proximal ends of the first and second frame beams are rotationally coupled to the stationary support rails of the hoist assembly, which may also be referred to as fixed rails.

Figure 4:
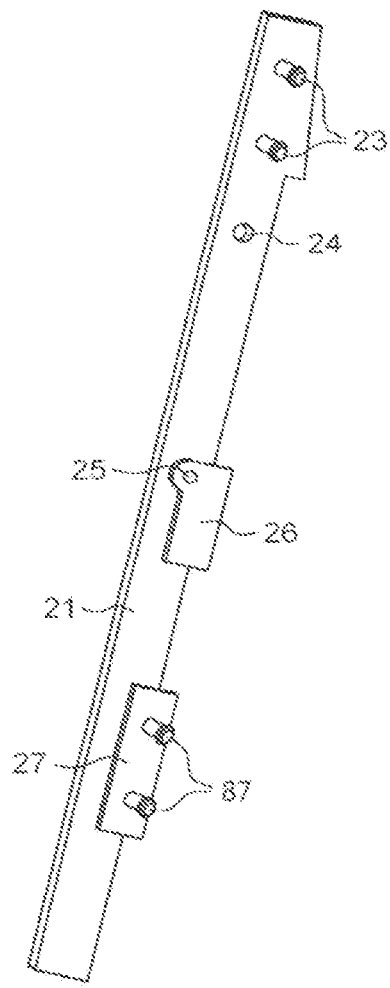
FIG. 4 shows a component view of a left stationary arm in accordance with the invention.

FIG. 4 shows a component view of a left stationary arm [21] in accordance with the invention, which may also be referred to as a support rail or a fixed rail. A preferred embodiment of a support rail includes a first set of at least one but preferably two threaded studs [23] at its first end, and a force member attachment bracket [26] affixed to the rail at an intermediate point of its length, and a clamp bracket [27] at its second end which comprises at least one threaded spindle [87.] The force member attachment bracket includes an aperture [25] for attachment by a clevis or similar attachment affordance of the extendable member. A pivot aperture [24] defines a rotational axis for the first pivotable frame or first pi frame of the hoist assembly. Other apertures may be provided in the support rails as a means of routing and securing hydraulic lines from unwanted movement especially from abrupt changes of hydraulic pressure.

Figure 5:
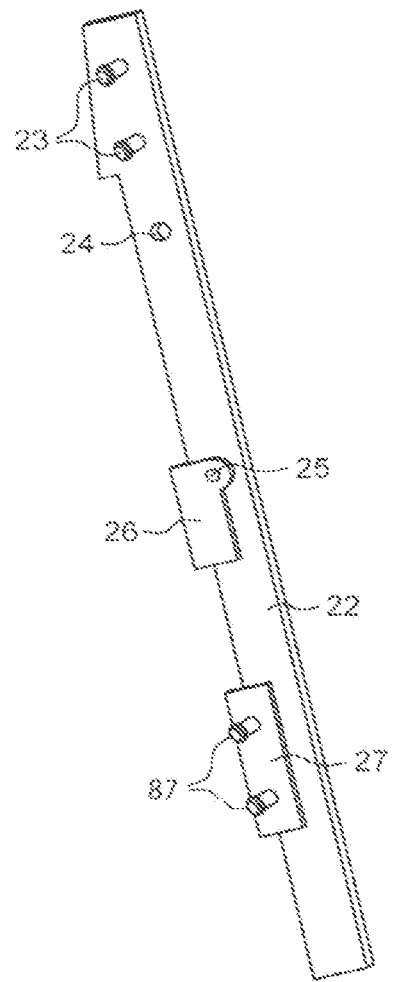
FIG. 5 shows a component view of a right stationary arm in accordance with the invention.

FIG. 5 shows a component view of a right stationary arm [22] in accordance with the invention, which may also be referred to as a support rail or a fixed rail. This support rail is fashioned symmetrically opposite to (i.e, as a mirror image of) the left support rail, and for the other components and features shown in this figure, the numbering shown here is the same as in FIG. 4.

Figure 6:
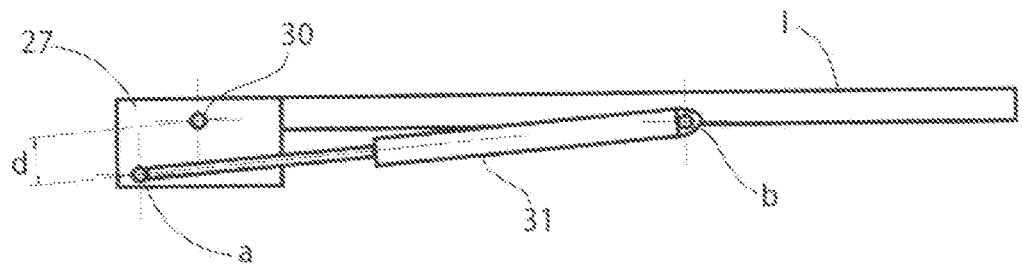
FIG. 6 shows an elevation view of a subset of components of a hoist assembly in accordance with the invention, including a support rail and a first pivotable frame in a position of repose.

FIG. 6 shows an elevation view of a subset of components of a hoist assembly in accordance with the invention, including a support rail and a first pivotable frame [I] in a position of repose. In this view the support rails and the pivotable frame appear superimposed upon each other. A force generating extendable member [31] has its first end [a] attached to a reinforcing plate [27] which is part of the pivotable frame. The second end [b] of the extendable member is attached to a rigid part of the vehicle or preferably connected as shown to a point on a support rail. The connection point on the pivotable frame is chosen to establish an offset [d] from the pivot axis of the pivotable frame, which is perpendicular to this view and passes through pivot bolt [30.] This offset establishes a lever or moment arm for developing the torque required to manipulate the movable portions of the hoist assembly. The offset provides beneficial leverage available throughout the entire range of motion of the pivotable frame.

Figure 7A:
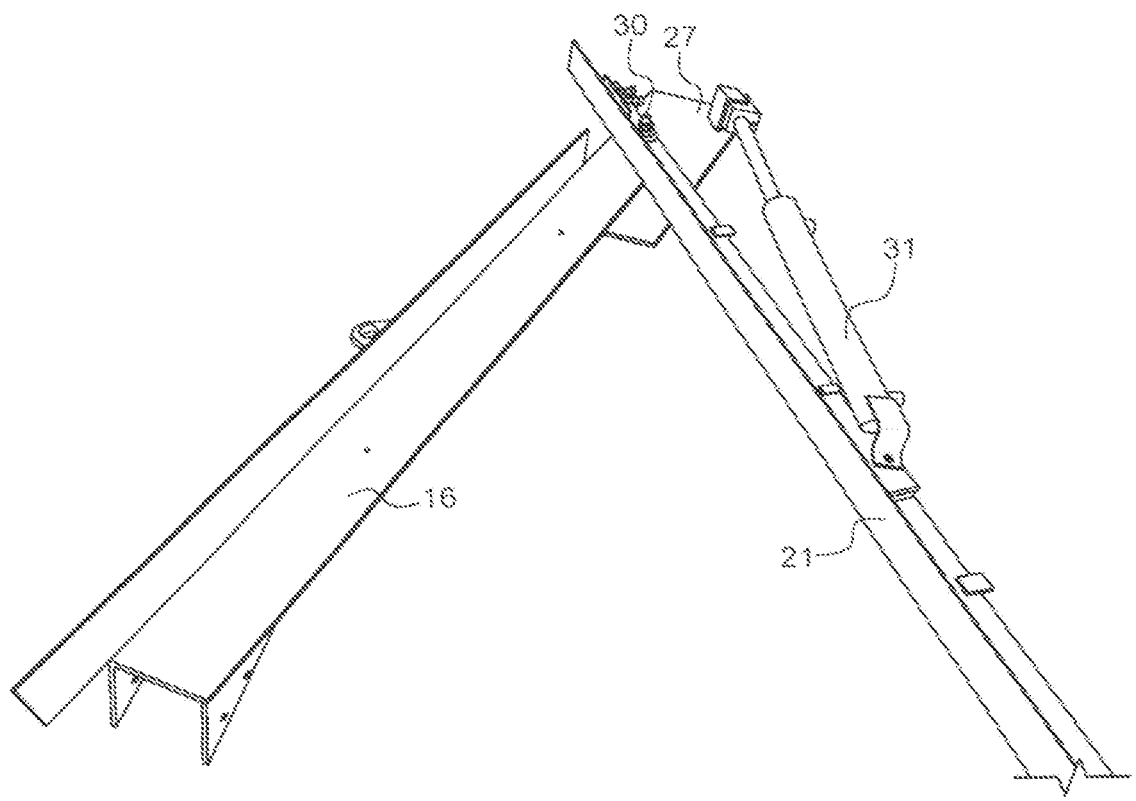
FIG. 7A shows a view of the left stationary arm secured to the left swing arm at a pivot point articulation.

FIG. 7A shows a view of the left stationary arm [21] secured to the second frame beam [16] of the first pivotable frame at a pivot point articulation, which defines the axis of rotation of the first pivotable frame through pivot bolt [30.] The first pivotable frame is shown partially raised out of a position of repose. According to the embodiment shown, a force generating extendable member [31] has its first end coupled to a reinforcing plate [27] of the second frame beam, and its second end coupled to an anchor point on the stationary arm which is also called a fixed rail or a support rail. Thus in this embodiment of a hoist assembly, the second end of the first extendable member is coupled to the first fixed rail. This coupling arrangement is preferred to coupling the extendable member to other unreinforced points of the vehicle.

Figure 7B:
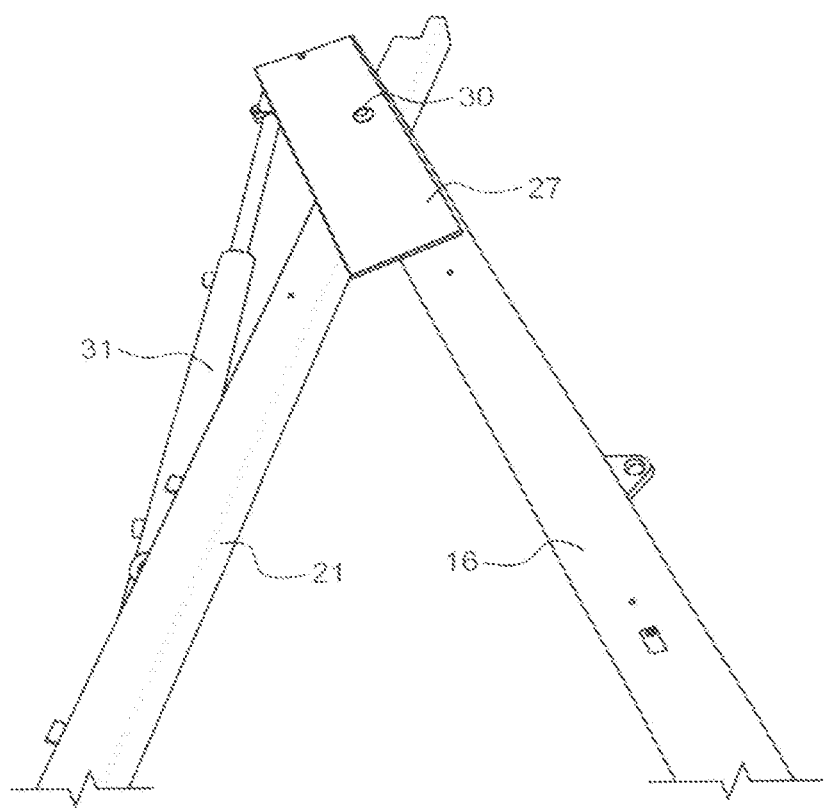
FIG. 7B shows the left stationary arm and second frame beam of FIG. 7A from a view opposite to the view orientation of FIG. 7A.

FIG. 7B shows the left stationary arm and second frame beam of FIG. 7A from a view opposite to the view orientation of FIG. 7A. The right stationary arm and first frame beam of the hoist assembly are similar to the components shown in this figure and FIG. 7A, but constructed symmetrically opposite to (i.e, as a mirror image of) the components shown in this figure and FIG. 7A, and for the components and features shown in this figure, the numbering shown here is the same as in FIG. 7A.

Figure 8:
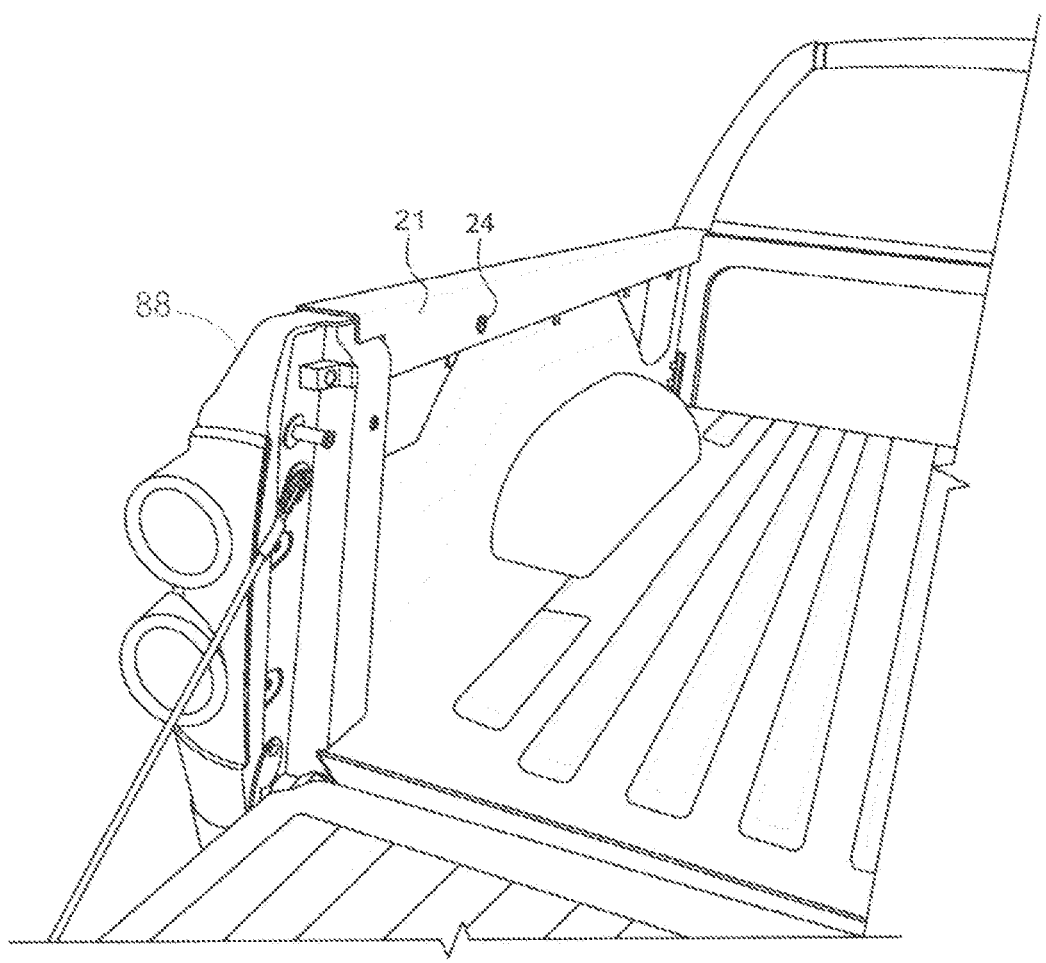
FIG. 8 shows a view of a left stationary arm secured to a left rail of a pickup truck bed.

FIG. 8 shows a view of a left stationary arm [21] secured to a left rail or left rear quarter panel [88] of a pickup truck bed. With the first pivotable frame and other moveable components of the hoist assembly removed for clarity, the pivot aperture [24] is also visible in this view.

Figure 9:
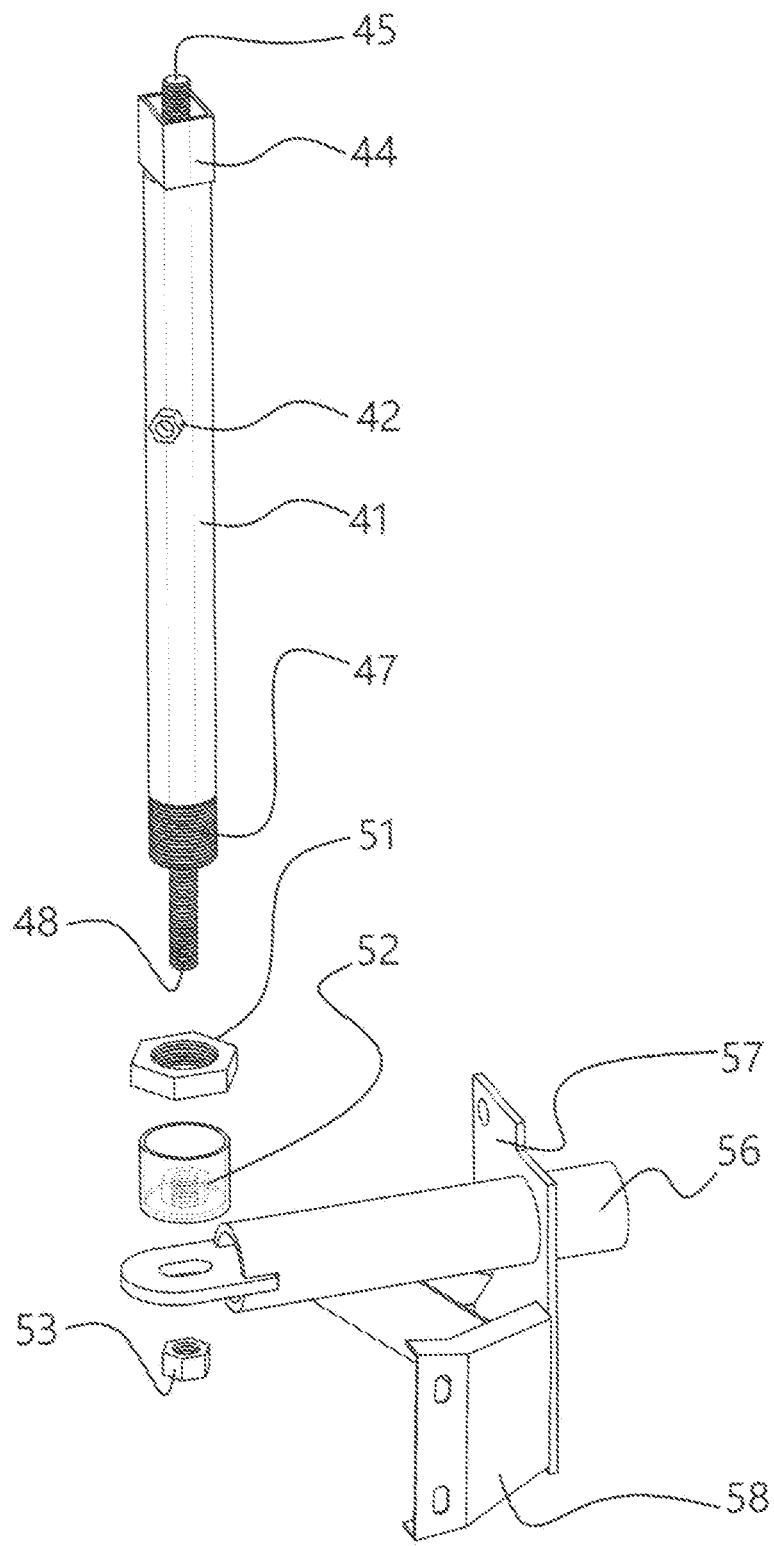
FIG. 9 shows an exploded view of components of a left-side mounting stake assembly, with its stake assembly support bracket components.

FIG. 9 shows an exploded view of components of a left-side mounting stake assembly, with its stake assembly support bracket components. Stake assembly mounts for the invention are designed to fit within and align with rectangular cutouts in pickup truck side body panels which are usually used for receiving the wooden vertical stakes of livestock panels for pickup truck beds. Stake assembly mounts provide secure attachment points with minimal modification required to the pickup truck body panels and minimal marring of the cosmetic aspects of these body parts. A vertical strut [41] has a first stepped threaded end and a second end having a rectangular head, and includes a transverse nut [42] affixed at an intermediate point along its length. The rectangular head fits the rectangular stake apertures in the body panels and constrains the strut from rotation when installed from below with the restraining nut [51.] The restraining nut engages a first threaded portion [47] of a first larger pitch diameter on the first end of the strut. A second threaded portion [48] of the first end of the strut has threads of a second pitch diameter and projects beyond the first threaded portion. The second end of the stake mounting strut includes a third threaded portion [45] to which the support rails of the hoist assembly attach. The third threaded portion is preferably a threaded stud residing within a rectangular tube section.

Hoist forces which pass through the strut are routed to the vehicle frame through a transverse strut [56] which attaches to the vehicle frame through one or more frame brackets [57, 58] to which the transverse strut is affixed, such as by welding. Additional support members may be included between the transverse strut and the frame brackets as required for the loading conditions anticipated for the hoist. The transverse strut is secured to the first threaded end of the vertical strut by a bottom nut [53] which secures the transverse strut against a strut spacer [52] which may also abut against the restraining nut.

Figure 10:
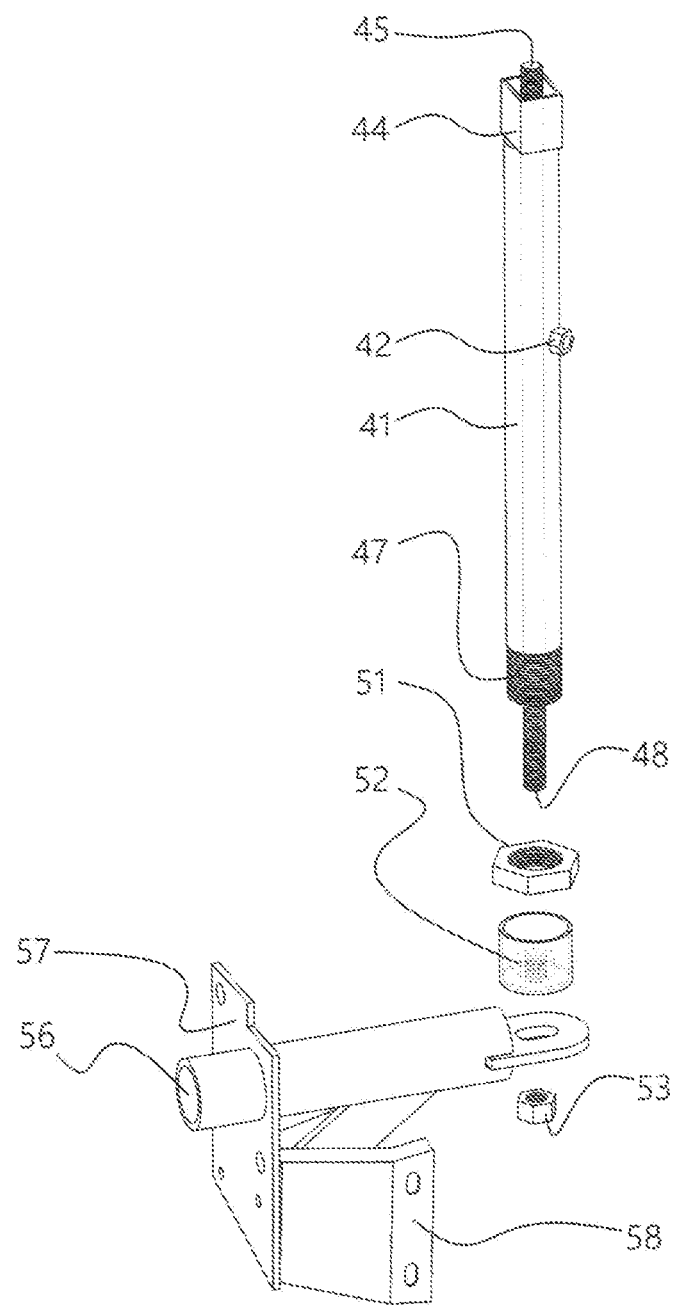
FIG. 10 shows an exploded view of components of a right-side mounting stake assembly, with its stake assembly support bracket components.

FIG. 10 shows an exploded view of components of a right-side mounting stake assembly, with its stake assembly support bracket components. The right-side mounting stake components are fashioned symmetrically opposite to (i.e, as a mirror image of) the components shown in FIG. 9, and for the components and features shown in this figure, the numbering shown here is the same as in FIG. 9. In an exemplary and preferred embodiment, a mounting stake assembly in accordance with the invention has a vertical strut [41] which is 1½" Schedule 80 steel tube. The first stepped threaded end includes a first threaded portion [47] having 1½" NPT threads which are tapered threads and preferable to straight threading because the complementary restraining nut [51] installed from below also has 1½ NPT tapered threads which will find a natural jamming point when installed. For straight threads, other more complex or more expensive means of jamming would be required, such as by deforming a nut into an oblong shape or including a thread jamming insert of a second deformable material.

A second threaded portion [48] of the first end of the strut has threads of a second pitch diameter and projects beyond the first threaded portion. These second threads are preferably ¾" UNC or ¾" UNF threads. The second end of the stake mounting strut includes a third threaded portion [45] to which the support rails of the hoist assembly attach and which are also ¾ UNC or ¾ UNF threads. One method of manufacture of this second end is to affix a ¾" weld nut within the 1½" Schedule 80 tube, and then to thread a length of ¾" threaded rod into the nut as a stud, and then welding the stud to the nut as a permanent assembly. The second end includes a rectangular head [44] within which this third treaded portion resides, and this head may be fabricated from a 2" length of 1"×2" rectangular steel tube. The rectangular head fits into rectangular stake apertures in pickup truck bed body panels and constrains the strut from rotation. The end of the rectangular head is preferably installed flush or slightly proud of the upper surface of the pickup truck bed. A section of tubing with other rectangular dimensions may be employed for various makes and models of pickup trucks.

The transverse nut [42] is used during installation of the struts into pickup truck bed side panels. A bolt threaded into this nut serves as a temporary handle or lever arm to assist an assembler in positioning the strut until it is secured by other hardware. The temporary bolt is used to prevent the strut from rotating while the large restraining nut is being secured. The temporary bolt is also easily accessed by removing a taillight assembly in the pickup truck body panel. The temporary bolt is then removed.

Pickup truck frames generally include C-channels which face towards each other and are connected together by bogies at various locations along the frame. Standardized towing packages which further reinforce the vehicle frame are also installed during factory assembly of the vehicle or as aftermarket upgrades. Frame brackets [57, 58] include pre-drilled perforations designed to intermate and secure to assembly hardware present in these towing package components. Other portions of the frame brackets are designed to be secured to other portions of the vehicle, such as the rear bumper.

In a particular application for a Dodge or Ram pickup, the frame brackets are formed from ⅜" plates. The installed towing package includes a transverse tube which is a Schedule 40 steel tube having an inside diameter approximately or slightly less than 2½". A transverse strut [56] of the invention fabricated from tube with a 2½" outer diameter passes through an existing aperture in the truck frame rail and inserts into the existing transverse tube as an interference fit such as a press fit or a heavy force fit.

The transverse strut includes a tang having an aperture through which the first threaded end of the vertical strut passes, and the strut is secured by a bottom nut [53] which in this exemplary embodiment is a ¾" nut. Vertical locational adjustment of the vertical strut is made using the strut spacer [52] as a height adjustment sleeve which sandwiches the transverse strut tang between itself and the bottom nut. In this embodiment the strut spacer includes a ¾" weld nut affixed within a section of tube as similarly described above for the ¾" threaded stud of the third threaded portion of the second end of the stake mounting strut.

Figure 11A:
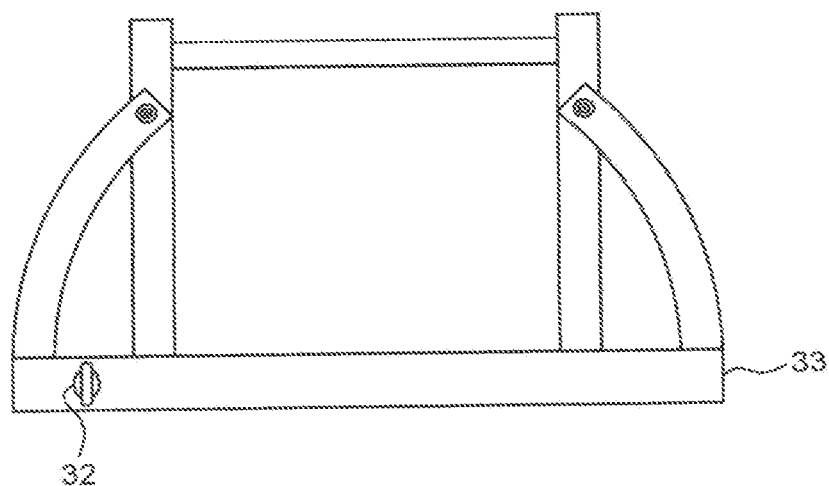
FIG. 11A shows an exterior view of a second pivotable frame in accordance with the invention which includes a locking safety mechanism.

FIG. 11A shows an exterior view of a second pivotable frame in accordance with the invention which includes a locking safety mechanism. A transverse channel [33] includes a locking handle [32] which allows the pivotable frame to be secured to the fixed rails of the hoist when not in use.

Figure 11B:
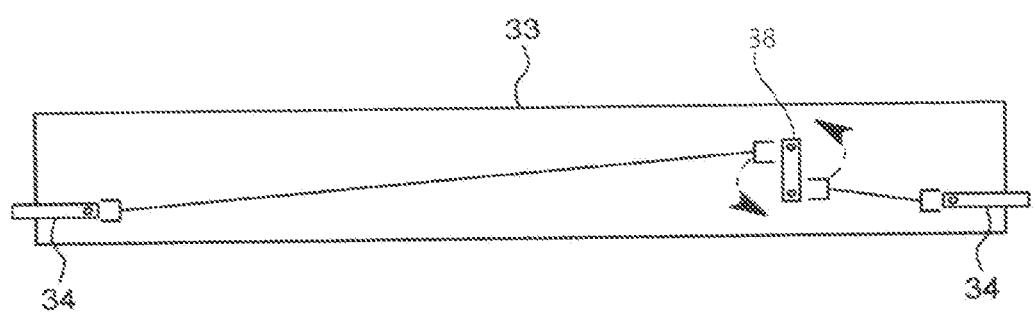
FIG. 11B shows an interior view of a locking safety mechanism in accordance with the invention.

FIG. 11B shows an interior view of a locking safety mechanism in accordance with the invention whose components reside within the transverse channel [33.] The locking handle seen in FIG. 11A rotates a toggle bar [38] which extends at least one and preferably two sliding deadbolts [34] which are received within apertures elsewhere along the bed side panels or provided in the fixed rails of the hoist assembly.

Figure 12:
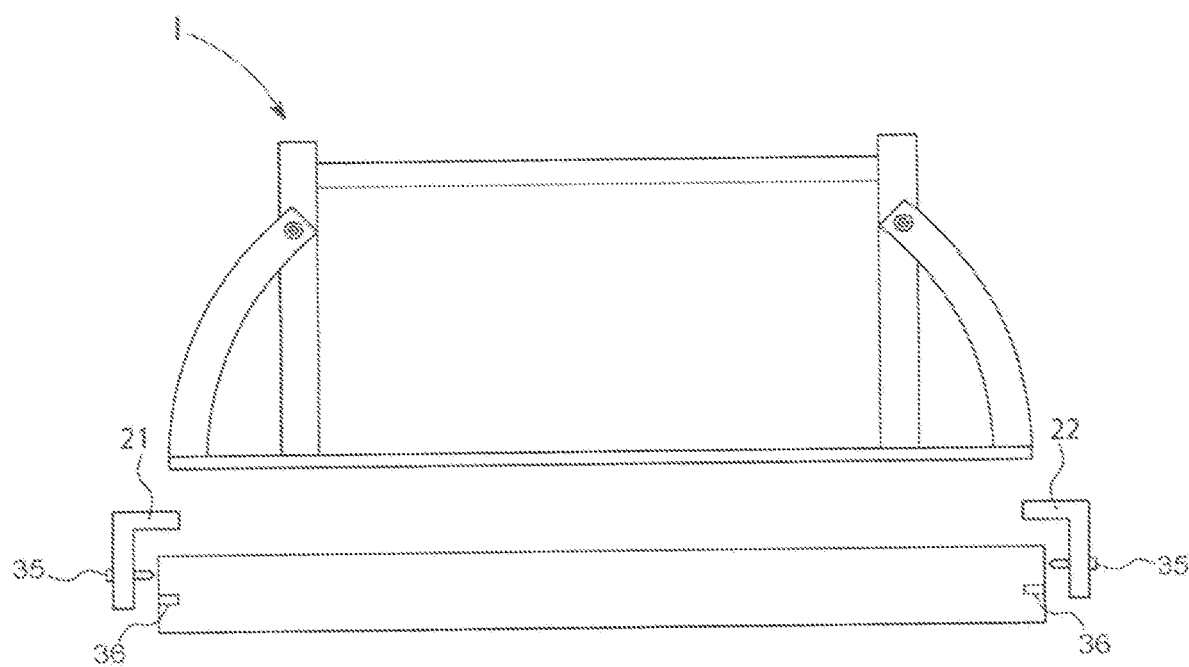
FIG. 12 shows a rear view of components of an embodiment in accordance with the invention as installed on a flatbed truck.

FIG. 12 shows a rear view of components of an embodiment in accordance with the invention as installed on a flatbed truck. With no pickup bed side panels, support rails [21] and [22] are instead secured directly to the flatbed by bolts [35] which are received into bolt-receiving apertures [36.] In this example, the lesser flanges of the angle channels of the support rails face towards each other.

Figure 13A:
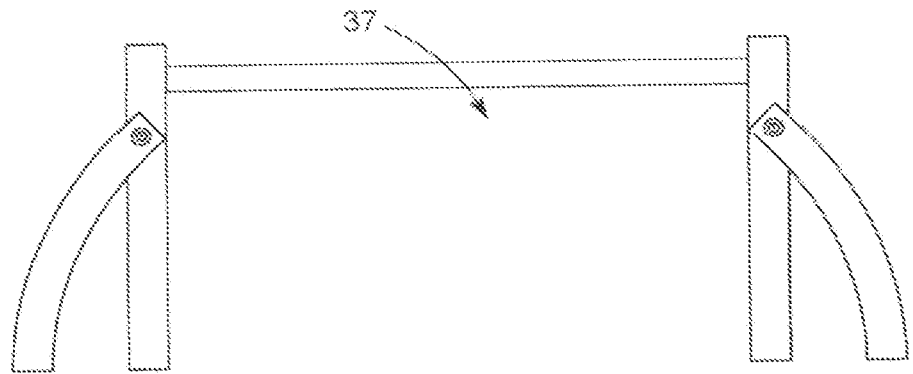
FIG. 13A shows a rear view of some components of an embodiment in accordance with the invention as installed near the rear of a cab of a typical pickup truck.

FIG. 13A shows a rear view of some components of an embodiment in accordance with the invention as installed near the rear of a cab of a typical pickup truck. The rectangular space [37] spanning between the extendable struts and beneath the crossbeam of the second pi frame of the hoist comports substantially with the nearly rectangular or trapezoidal aspect of the rear window of a pickup truck or flatbed truck, and thus driver visibility in minimally impaired by the invention if not substantially unaffected.

Figure 13B:
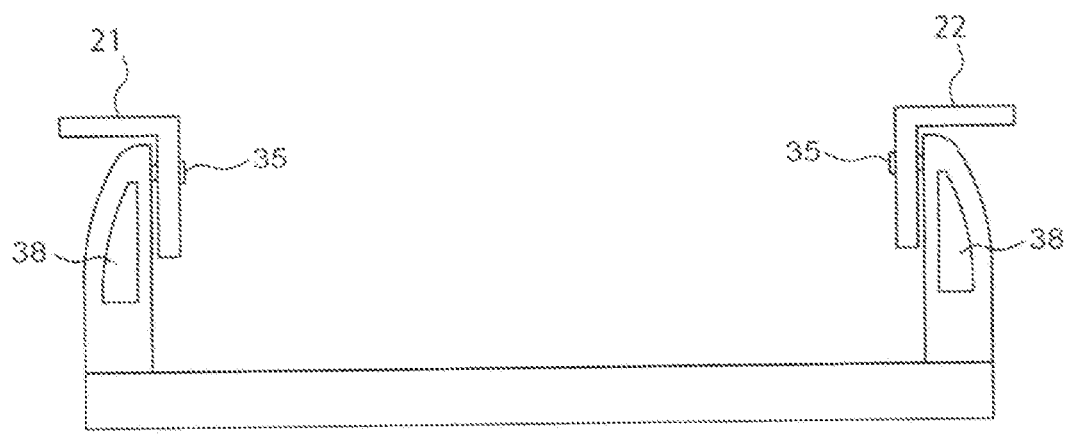
FIG. 13B shows a rear view of some components of an embodiment in accordance with the invention as installed along the bed rails of a typical pickup truck.

FIG. 13B shows a rear view of some components of an embodiment in accordance with the invention as installed along the bed rails of a typical pickup truck. Tail lights [38] are represented stylistically for reference. Although more crude, a more permanent installation of these rails to the pickup bed may be secured using a plurality of fasteners [35] which secure these elements directly to the pickup truck side body panels. In comparison to the flatbed installation, the angle channels of the support rails [21] and [22] are installed with the lesser flanges of the angle channels of the support rails facing away from each other.

Figure 14:
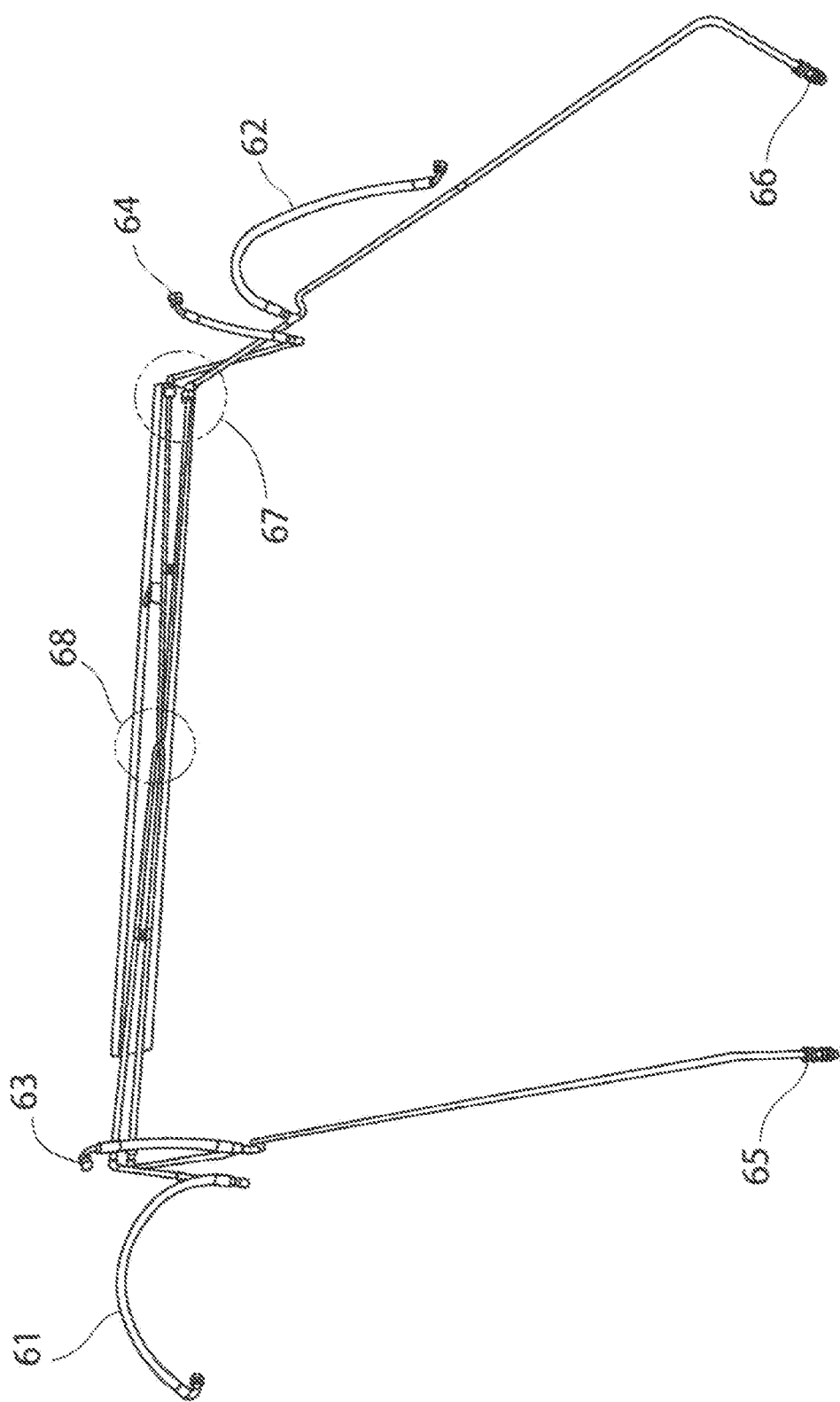
FIG. 14 shows a view of hydraulic lines that support the invention.

FIG. 14 shows a view of hydraulic lines that support the invention. The lines themselves may comprise elastomers and braided materials or they may all be metal such as stainless steel. In this configuration shown, lines [65] and [66] connect to the left- and right-side cylinders which are the first and second extendable members which raise and lower the first pivotable frame. Lines [62] and [64] connect to the third extendable member, and lines [61] and [63] connect to the fourth extendable member. The third and fourth extendable members pivot the second pivotable frame with respect to the first pivotable frame. According to a preferred embodiment, the hydraulic lines may cross over each other at an intermediate point identified by phantom line circle [68,] and phantom line circle [67] defines a region for the enlargement seen in FIG. 16.

Figure 15:
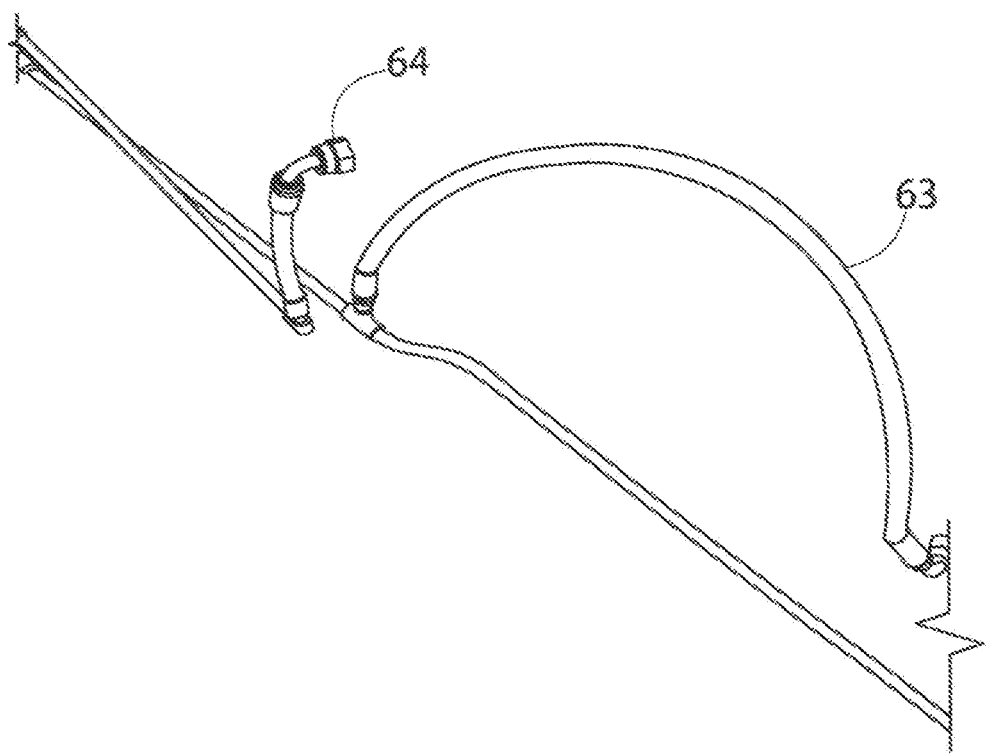
FIG. 15 shows an enlarged view of a portion of hydraulic lines that support the invention.

FIG. 15 shows an enlarged view of a portion of hydraulic lines that connect to an extendable member which is connected between the first and second pivotable frame of the invention.

Figure 16:
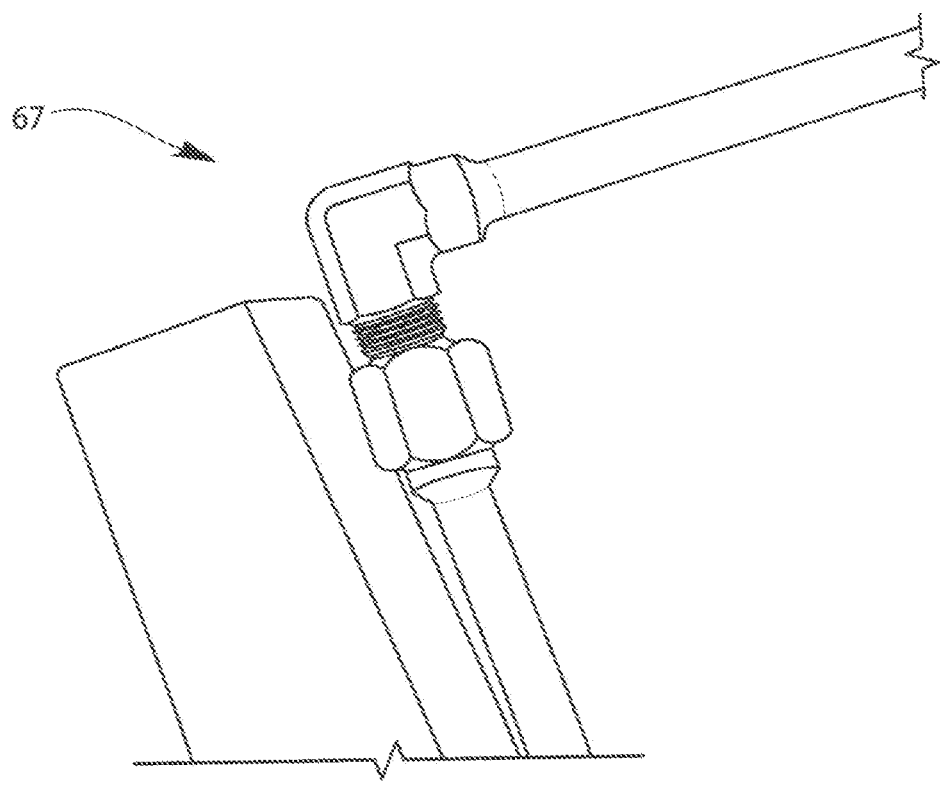
FIG. 16 shows a close-up view of an L-joint and fittings of an embodiment having metal hydraulic lines that support the invention.

FIG. 16 shows a close-up view of an L-joint and fittings of an embodiment having metal hydraulic lines that support the invention.

Figure 17:
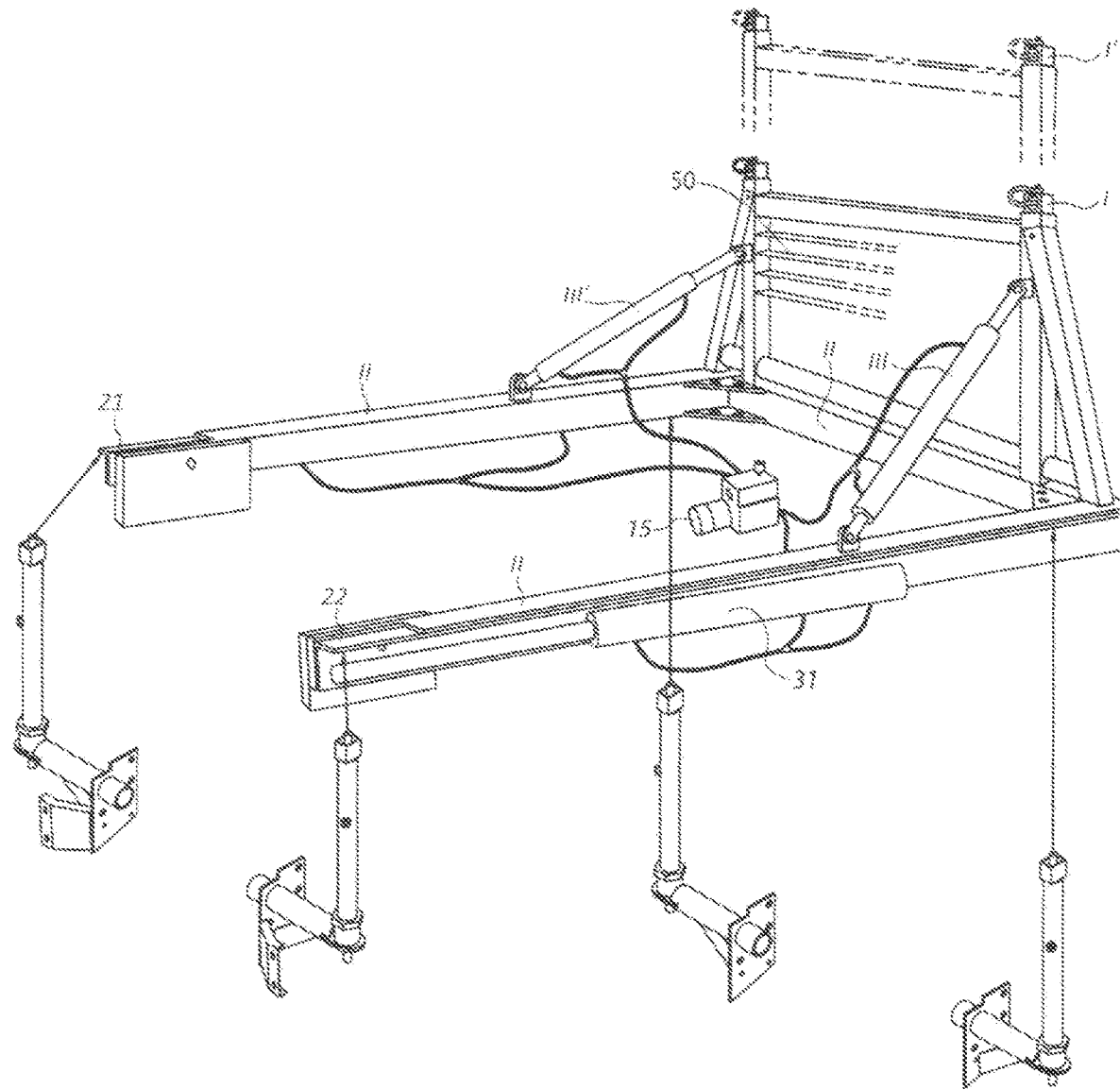
FIG. 17 shows an embodiment of a hoist assembly including mounting stake assemblies in accordance with the invention, as configured for installation in a pickup truck bed having siderails which include stake holes typically used for fence side panels.

FIG. 17 shows an embodiment of a hoist assembly including mounting stake assemblies in accordance with the invention, as configured for installation in a pickup truck bed having siderails which include stake holes typically used for fence side panels. The mounting stake assemblies secure the fixed rails [21] and [22] to the side panels of the pickup truck bed. The first pivotable frame [II] supports a second pivotable frame [I.] The first pivotable frame is raised and lowered by at least one force generating extendable member [31] which preferably has a twin connected to the opposite side of the pivotable frame and not seen from this viewpoint. At least one but preferably two more force generating extendable members [III] and [III'] pivot a second pivotable frame [I] attached to the first pivotable frame. The second pivotable frame includes extendable members, and an extendable portion of this second pivotable frame is shown in an extended position [I'.] Pressure for actuating the extendable members is delivered to the hydraulic fluid by a central hydraulic pump [15.] Other embodiments of force generating extendable members within the scope if the invention include pneumatic cylinders and motor-driven jack screws. Since the second pivotable frame may also comprise or act as a vehicle rollbar protecting the cab and its rear window glass, it may optionally comprise slats [50,] grillework, perforated or expanded metal, or linked webbing such as heavy-gauge woven wire welded wire mesh, or chain link wire to detain loose objects which may otherwise crash into the cabin in a collision.

The strut assemblies installed in the set of rectangular stake apertures in pickup truck bed body panels are useful for securing other vehicle accessories besides the inventive hoist assembly, including but not limited to camper shells, ladder racks, tool boxes, bed covers, bed rail caps, tie-downs, cargo bars, cargo bed extenders, stake sides for livestock transport, side bed boxes, liquid tanks, and bed liners.

Figure 18:
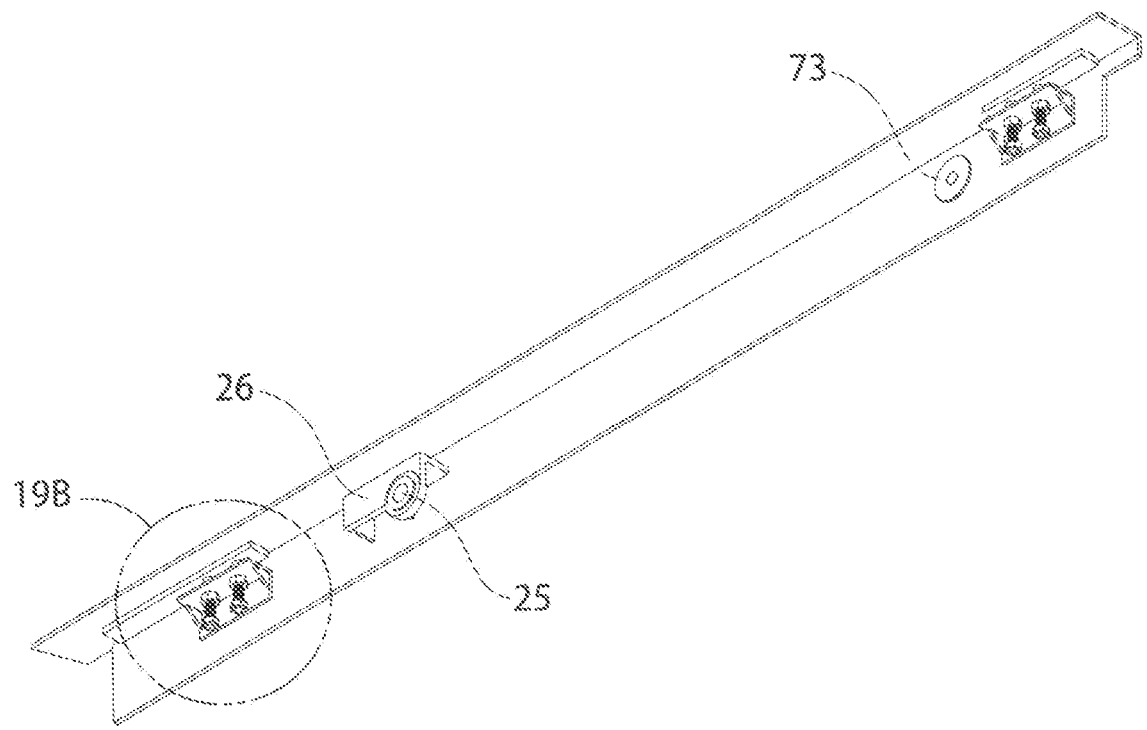
FIG. 18 shows a left stationary arm in accordance with the invention which includes bed clamp brackets, a pivot bushing, and a pivot bushing bracket.

FIG. 18 shows a left stationary arm or support rail in accordance with the invention which includes bed clamp brackets, a force member attachment bracket [26] having an attachment aperture [25] for a clevis or similar attachment affordance for a force generating extendable member, and a pivot aperture which includes a pivot reinforcement boss [73] which may be created by welding a hardened washer to the angle channel which comprises this support rail. A phantom circle [19B] identifies one of the clamp brackets to be described in FIG. 19B.

Figure 19A:
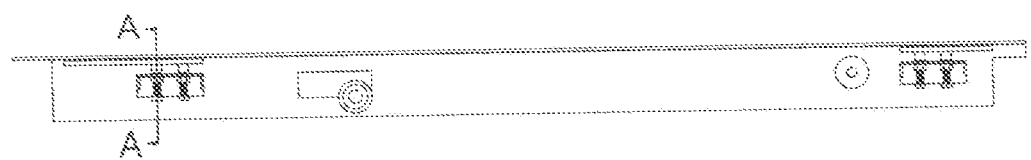
FIG. 19A shows the stationary arm of FIG. 18 and section line A-A for cross section view FIG. 19B.

FIG. 19A shows the stationary arm of FIG. 18 and section line A-A for cross section view FIG. 19B.

FIG. 19B shows a cross section view of bed clamp bracket components taken at section line A-A in FIG. 19A. The support rail [16] further comprises an angle channel defining conjoined first and second anhedral surfaces, a clamp bracket [27] comprising a threaded aperture, and a threaded spindle [87] received within the threaded aperture. In this embodiment the threaded aperture is part of a threaded tube [86] welded to the clamp bracket, which is affixed to a the second anhedral surface of the angle channel. Secure attachment is afforded by pinching the pickup truck body panel [88] between the first anhedral surface of the angle channel and a pressure pad [81] which also includes a threaded aperture for adjustably coupling to the threaded spindle. The pressure pad resides between the clamp bracket and the first anhedral surface of the angle channel. The threaded spindle is preferably a bolt having a hexagonal head and preferably made of a high-strength alloy.

FIG. 20A shows an extendible beam with a cutaway of a fixed tube revealing an extendable portion linearly driven by threaded hardware powered by bevel gears. According to this mechanism a first gear [92] is mounted on a drive shaft [95] driven by a motor, and a first extendable beam of a pivotable frame further comprises a first threaded member [97] fixed to an extendable portion [28] of the first extendable beam [6,] with a second, rotatable threaded member [96] threadingly engaged to the first threaded member, and a second gear [93] coupled to the second threaded member and engaged with the first gear. Although in this embodiment the first threaded member has female threads and the second threaded member is a rotatable threaded rod, it is also within the scope of the invention to employ a rotatable tube having internal threads receiving and disgorging a stationary male threaded rod attached to the extendable beam. The fixed and extendable portions of this extendable beam may be made from nested square or rectangular tubing.

FIG. 20B shows two extendible beams [6] and [8] of a second pivotable frame, wherein a single motor-driven shaft [95] powers meshed bevel gears in each extendable beam so that their extendable portions [28] and [27] move in tandem.

While certain features and aspects have been described with respect to exemplary embodiments, one skilled in the art will recognize that numerous modifications are possible. Also, while certain functionality is ascribed to certain system components, unless the context dictates otherwise, this functionality may be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Furthermore, the procedures described with respect to one method or process may be incorporated within other described methods or processes; likewise, system components described according to a particular structural configuration and/or with respect to one system may be organized in alternative structural configurations and/or incorporated within other described systems.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

Hence, while various embodiments are described with or without certain features for ease of description and to illustrate exemplary aspects of those embodiments, the various components and/or features described herein with respect to a particular embodiment may be substituted, added, and/or subtracted from among other described embodiments, unless the context dictates otherwise. Thus, unauthorized instances of apparatuses and methods claimed herein are to be considered infringing, no matter where in the world they are advertised, sold, offered for sale, used, possessed, or performed.

Consequently and in summary, although many exemplary embodiments are described above, it will be appreciated that the invention is intended to cover all modifications and equivalents within the scope of the following claims.

What is claimed is:

1. A hoist assembly, comprising:
   first and second support rails,
   a first pivotable frame comprising
      a first frame beam with its proximal end rotationally coupled to said first support rail about a first axis of rotation,
      a second frame beam with its proximal end rotationally coupled to said second support rail about said first axis of rotation,
      a third frame beam spanning between a distal end of said first beam and a distal end of said second beam,
   a second pivotable frame coupled to said first pivotable frame, comprising
      first and second extendable beams each with their proximal ends coupled to said third beam of said first pivotable frame, and
      a tie bar spanning between distal ends of said first and second extendable beams, and at least a first extendable member with its first end coupled to said first frame beam.

2. The hoist assembly of claim 1, wherein a second end of said first extendable member is coupled to said first support rail.

3. The hoist assembly of claim 1, wherein said second pivotable frame is rotatably coupled to said first pivotable frame about an axis parallel to said third frame beam.

4. The hoist assembly of claim 1, further comprising a second extendable member coupled between said second support rail and said second frame beam.

5. The hoist assembly of claim 1 wherein said first pivotable frame further comprises gussets affixed to said third beam.

6. The hoist assembly of claim 4, further comprising at least a third extendable member coupled between said first pivotable frame and said second pivotable frame.

7. The hoist assembly of claim 6, further comprising at least a fourth extendable member coupled between said second beam and said second extendable beam.

8. The hoist assembly of claim 1, further comprising a first gear, and wherein said first extendable beam further comprises:
   a first threaded member fixed to an extendable portion of said first extendable beam,
   a second, rotatable threaded member threadingly engaged to said first threaded member, and
   a second gear coupled to said second threaded member and engaged with said first gear.

9. The hoist assembly of claim 1, wherein said first support rail further comprises
   an angle channel defining conjoined first and second anhedral surfaces,
   a clamp bracket comprising a threaded aperture,
   a threaded spindle received within said threaded aperture, and
   a pressure pad,
   with said clamp bracket affixed to a said second anhedral surface, and
   said pressure pad disposed between said clamp bracket and said first anhedral surface.

10. The hoist assembly of claim 9, wherein said pressure pad further comprises threads, and said threaded spindle further comprises a hexagonal head.

11. The hoist assembly of claim 1, wherein said second pivotable frame further comprises a rollover bar.

12. A hoist assembly, comprising:
   first and second fixed rails,
   a first pi frame comprising a first lintel spanning between first and second legs,
       said first leg attached to at its proximal end to said lintel and rotatably coupled to said first fixed rail at its distal end, and
       said second leg attached at its proximal end to said lintel and rotatably coupled to said second fixed rail at its distal end, and
   a second pi frame comprising a second lintel spanning between first and second extendable beams, said extendable beams each being rotatably coupled to said first lintel, and
       a first extendable member with its first end coupled to said first leg.

13. The hoist assembly of claim 12, wherein a second end of said first extendable member is coupled to said first fixed rail.

14. The hoist assembly of claim 13, further comprising a second extendable member coupled between said second fixed rail and said second leg.

15. The hoist assembly of claim 14, further comprising at least a third extendable member coupled between said first leg and said second pi frame.

16. The hoist assembly of claim 12, further comprising a first gear, and wherein said first extendable beam further comprises:
   a first threaded member fixed to an extendable portion of said first extendable beam,
   a second, rotatable threaded member threadingly engaged to said first threaded member, and
   a second gear coupled to said second threaded member and engaged with said first gear.

17. The hoist assembly of claim 12, wherein said first fixed rail further comprises
   an angle channel defining conjoined first and second anhedral surfaces,
   a clamp bracket comprising a threaded aperture,
   a threaded spindle received within said threaded aperture, and
   a pressure pad,
   with said clamp bracket affixed to a said second anhedral surface, and
   said pressure pad disposed between said clamp bracket and said first anhedral surface.

18. The hoist assembly of claim 17, wherein said pressure pad further comprises threads, and said threaded spindle further comprises a hexagonal head.

19. The hoist assembly of claim 12, wherein said second pi frame further comprises a rollover bar.

20. The hoist assembly of claim 12, wherein at least one from among said first and second fixed rails is attached to a mounting strut comprising
   a tube having first and second ends,
       with said first end comprising a first threaded portion having a threads of a first pitch diameter and a second threaded portion having threads of a second pitch diameter, and
       said second end comprising a threaded stud residing within a rectangular tube.

* * * * *